Patented June 4, 1940

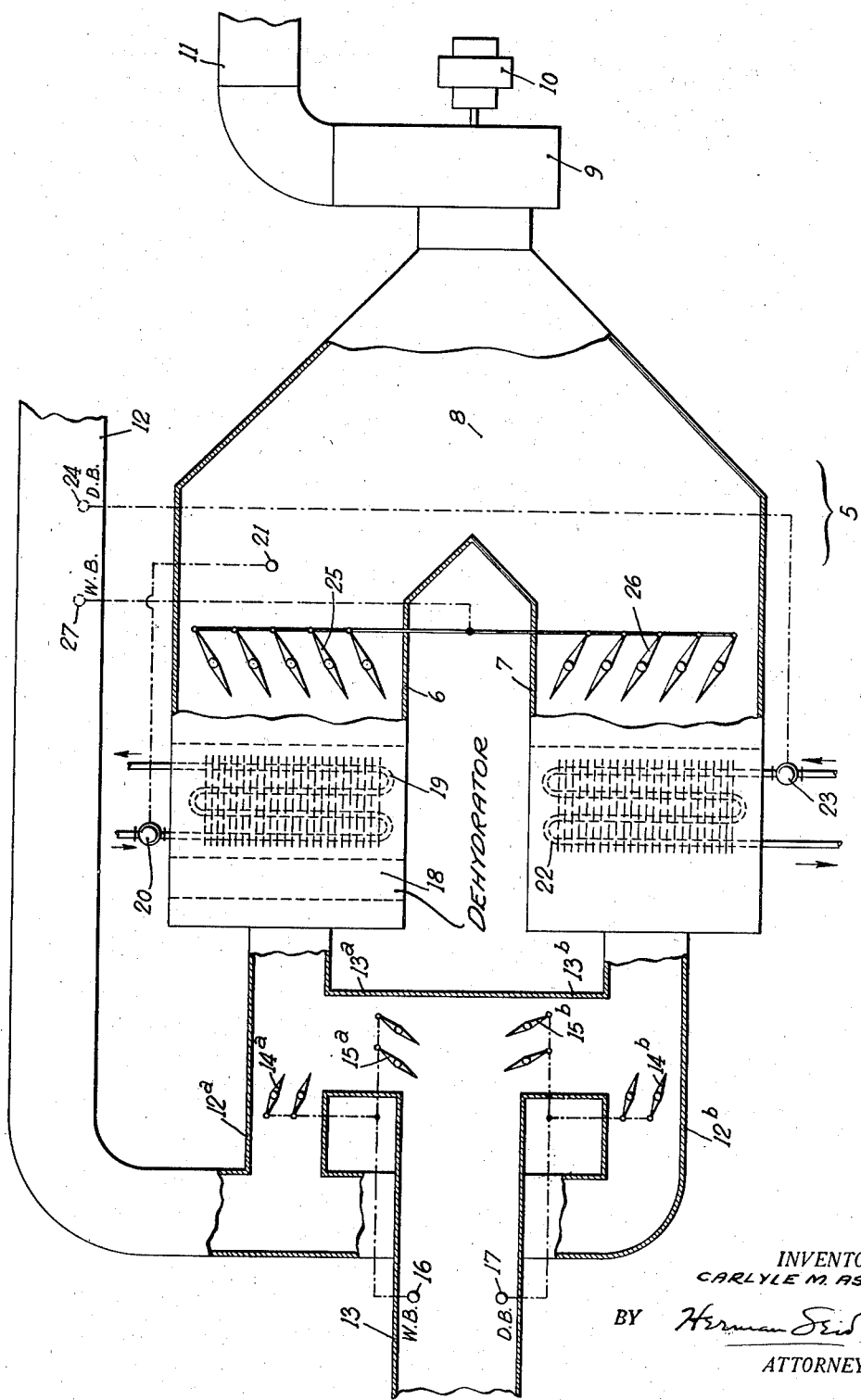

2,203,560

UNITED STATES PATENT OFFICE 2,203,560

AIR CONDITIONING METHOD

Carlyle M. Ashley, Syracuse, N. Y., assignor to Carrier Corporation, Syracuse, N. Y., a corporation of Delaware Application April 6, 1938, Serial No. 200,497

7 Claims. (Cl. 236—44)

This invention relates to air conditioning.

The particular object of the invention is to provide an improved method of air conditioning an enclosure.

In air conditioning enclosures it is necessary not only to control the dry bulb temperature of the air but also to maintain the moisture content of the air within a predetermined range. Under many operating conditions the maintenance of the moisture content of the air between desired limits necessitates the removal of moisture from air being conditioned for supply to the conditioned enclosure. Such moisture removal may be effected, broadly, in either of two ways, dehumidification and dehydration. Dehumidification of the air is accomplished by cooling the air below its dewpoint whereby to precipitate moisture therefrom. This method of reducing the moisture content of the air has the disadvantage that the cooling process and the moisture reduction process are integrally related results of the same operation, which fact presents certain control difficulties. A further disadvantage of effecting moisture reduction by dehumidification, is that the air thus dehumidified generally must be reheated to a substantial degree in order that it may be suitable for supply to a conditioned enclosure. Reduction of the moisture content of air by dehydration possesses neither of these disadvantages of the dehumidifying process. When air is dehydrated, the reduction of the moisture content and the regulation of the dry bulb temperature may be accomplished independently and under separate control. Further, there is no necessity for reheating dehydrated air, since the dehydration process tends to raise the dry bulb temperature by release of the latent heat of vaporization of the moisture removed from the air. Furthermore, dehumidification usually requires the use of a relatively great amount of artificial refrigeration in order to maintain the dewpoint of the conditioned air at a sufficiently low value. However, when dehydration is employed for controlling the moisture content of conditioned air, much less artificial refrigeration is required, and very frequently this may be dispensed with entirely.

It is an object of the present invention to provide an improved method of conditioning air in which the temperature and humidity of the air are separately controlled, and in which the moisture content of the air being conditioned is reduced by dehydration.

It is another object of the invention to provide a method of conditioning air in which the air to be conditioned is divided into two main streams, one of these streams being subjected primarily to the action of a dehydrating agent and the other of the streams being subjected primarily to the action of a cooling medium, the streams being reunited after such treatment to form a final mixture having desired characteristics of temperature and humidity and being suitable for direct introduction into an enclosure to be conditioned.

It is another object of the invention to provide an air conditioning system in which the air to be conditioned is routed in two main streams, one of which is subjected primarily to the action of a dehydrating agent, and the other of which streams is subjected primarily to the action of a cooling medium, at least one of said streams being formed of outdoor air and return air from the conditioned enclosure.

A feature of the invention resides in circulating a plurality of streams of air, subjecting one of said streams primarily to the action of a dehydrating agent and another of said streams primarily to the action of a cooling medium, each of said streams comprising return air and/or outdoor air, the character of the air forming each of said streams being regulated and controlled in accordance with changes in the condition of outdoor air.

Another feature of the invention resides in conditioning two streams of air, one of said streams being conditioned primarily as to moisture content, the other of said streams being conditioned primarily as to dry bulb temperature, mixing said streams, supplying the resultant mixture to an enclosure to be conditioned, and controlling the proportions of air from said different streams in said mixture in accordance with changes in atmospheric conditions in the conditioned enclosure.

Other objects and feature of the invention will be more apparent from the following description to be read in connection with the accompanying drawing which diagrammatically illustrates one embodiment of the invention.

Referring now to the drawing, the numeral 5 designates generally the air conditioning apparatus comprising a casing section 6, a casing section 7, and a mixing chamber 8 with which both of said sections communicate. A fan 9 driven by motor 10 draws air through the casing sections 6 and 7 and through mixing chamber 8, and discharges this air through duct 11 into a conditioned enclosure (not shown). A return duct 12 connecting to the conditioned enclosure is adapted to communicate with casing section 6 through branch 12a and to communicate with casing section 7 through branch 12b. There is provided a suitable duct 13 leading to the outdoor atmosphere and connecting to the branch duct 12a through a branch 13a and connecting to the branch duct 12b through branch 13b. If desired, of course, branches 13a and 13b might be connected directly to casing sections 6 and 7 rather than to the branch ducts 12a and 12b. By means of the ducts 12 and 13 and their branches, each casing section is adapted to receive air from the outdoor atmosphere and air withdrawn from the enclosure.

Duct section 12a is provided with dampers 14a and the duct section 13a is provided with dampers 15a. Dampers 14a and 15a are differentially connected so that when dampers 14a are opened more widely, dampers 15a will be correspondingly closed and vice-versa, thus to control the proportions of return air and outdoor air supplied to the casing section 6. The dampers 14a and 15a are preferably controlled in accordance with changes in the condition of the entering outdoor air, as reflected, for example, by a wet bulb thermostat or hygrostat 16 positioned in the duct 13. The dampers are so arranged that when the outdoor wet bulb temperature rises, the dampers 15a close somewhat and the dampers 14a correspondingly open wider. When the outdoor wet bulb temperature drops, the dampers 15a are opened more widely and the dampers 14a are correspondingly closed. When the outdoor wet bulb temperature exceeds a predetermined value, the dampers 15a are closed entirely, except that there is preferably provided a damper stop or an auxiliary damper adapted to pass a certain minimum amount of fresh air into casing section 6 at all times. Since such arrangements are well known and understood by those skilled in the art, no further description of this feature is deemed required here.

Similarly, duct section 12b is provided with dampers 14b and duct section 13b is provided with dampers 15b. As in the case of the corresponding dampers serving section 6, the dampers 14b and 15b are differentially connected, and are adjusted in accordance with changes in the condition of the outdoor air admitted through duct 13. As shown, a dry bulb thermostat 17 controls the positions of dampers 14b and 15b. When the dry bulb temperature of the outdoor air is below a predetermined limit, the dampers 15b are opened and the dampers 14b are closed. When the dry bulb temperature of the entering outdoor air rises, the dampers 15b are closed somewhat and the dampers 14b are correspondingly opened wider, reverse action of the dampers taking place when the outdoor dry bulb temperature falls. When the dry bulb temperature of the outdoor air rises above a predetermined maximum, the dampers 15b will close entirely and the dampers 14b will be wide open. As in the case of the dampers 15a, duct section 13b may be provided, if desired, with means for passing a certain minimum amount of outdoor air at all times. As will be understood, means for always admitting a predetermined amount of outdoor air may be associated with either or both of casing sections 6 and 7.

The conditioner section 6 is provided with a dehydrator generally designated 18. The dehydrator may be of any well-known type and may utilize either a liquid absorber such as lithium chloride or a solid adsorber such as silica gel. Since this apparatus does not, per se, form a part of the invention, and since various types of such apparatus are well-known and understood by those skilled in the art, no further description of the dehydrator 18 is deemed required here. It is to be understood that suitable provision is made for the regeneration of the dehydrating agent in accordance with conventional practice, and also that the dehydrator is controlled in any well-known manner to regulate desirably the moisture content of the air delivered from the dehydrator 18. Thus, for example, if the dehydrating apparatus employs a liquid dehydrating agent such as lithium chloride, which is regenerated in a suitable regenerator, the supply of fluid to the regenerator may be controlled in accordance with the density of the liquid which contacts with air in the dehydrator 18 so that the regenerating action will be controlled to provide a constant density of the liquid which contacts the air.

As an incident to the dehydration process, there is usually a substantial rise in the dry bulb temperature of the conditioned air. This rise in the sensible heat of the air is due to the release of the latent heat of vaporization of the moisture removed from the air. To counteract this tendency of the dry bulb temperature of the dehydrated air to rise, there may be provided a cooling means such as coil 19 for cooling the air. Coil 19 is preferably provided with any well-known type of extended surface such as plate or spiral finning, to increase the heat exchange capacity thereof. The cooling medium supplied to the coils 19 may comprise, for example, cold water drawn from some suitable source, such as a deep well or a city water main. Since the coils 19 remove sensible heat only from the air, and since the dry bulb temperature of the dehydrated air is relatively high, cold water drawn from such non-refrigerated sources is quite sufficient to provide the desired cooling. To control the leaving dry bulb temperature of the dehydrated air, there is preferably provided a valve 20 for controlling the supply of cooling medium to the coil 19, the valve 20 being under the control of a thermostat 21 located in the path of the air leaving casing section 6. While the cooling coils 19 are provided for somewhat reducing the dry bulb temperature of the dehydrated air, it is to be understood that these coils may be dispensed with, if desired, and that the main function of casing section 6 is to effect the dehydration of the air passing therethrough, by operation of the dehydrator 18.

The primary function of the casing section 7 is to effect reduction of the dry bulb temperature of the air circulating therethrough. Accordingly, casing section 7 is provided with cooling means such as cooling coils 22 suitably supplied with refrigerant, the circulation of which is controlled as by valve 23. Cooling medium of any desired type may be supplied to the coils 22. In most applications the temperature of water drawn from a well, an evaporative cooling tower, or from a city main will generally be sufficiently low so that there is no necessity for utilizing artificial refrigeration, but it is to be understood that if such supply is not adequate to provide the required cooling, then the cooling medium circulated through coils 22 may be cooled by or comprise the circulating medium of an artificial refrigerating system.

The valve 23, controlling the supply of cooling medium to the coils 22, is preferably under the control of dry bulb thermostat 24, which may be located in return air duct 12 or in the path of air leaving the coils 22. It is to be understood that control of the cooling effect exerted upon air passing through casing section 7 may be effected in other ways without departing from the spirit of the invention. Thus, for example, thermostat 24 might be utilized to control the temperature of water circulated through the coil, as by use of well-known mixing valves; or if direct expansion of refrigerant is used for cooling, an expansion valve or a back pressure valve may be suitably controlled by thermostat 24 to provide desired cooling effect.

Casing section 6 is provided with dampers 25 and casing section 7 is provided with dampers 26. Dampers 25 and 26 are differentially connected so that as one set of dampers opens more widely, the other correspondingly closes, and vice-versa. These dampers control the relative proportions of air drawn from sections 6 and 7 which are supplied to the conditioned enclosure by fan 9. The dampers 25 and 26 are preferably adjusted automatically in response to changes in atmospheric conditions in the conditioned enclosure. These may be reflected, for example, by a wet bulb thermostat or hygrostat 27 located in return duct 12, the hygrostat 27 controlling the relative positions of the dampers 25 and 26. Thus, when there is too high a wet bulb temperature prevailing in the enclosure, the wet bulb thermostat or hygrostat 27 will operate to open the dampers 25 more widely and to correspondingly close dampers 26, thus to admit to the enclosure a greater proportion of air having a low moisture content. When the wet bulb temperature in the enclosure (and hence in duct 12) falls, the dampers 25 will be somewhat closed and the dampers 26 correspondingly open wider, thus to supply to the enclosure a smaller proportion of air having a low moisture content. In this way, the desired humidity is maintained in the enclosure. The desired dry bulb temperature is maintained by thermostat 24. Accordingly, desired atmospheric conditions are maintained within the conditioned enclosure.

Since many changes may be made in the invention without departing from its scope, it is intended that all matter contained in the above description or shown in the accompanying drawing shall be interpreted as illustrative only and not in a limiting sense, applicant limiting himself only as indicated in the appended claims.

I claim:

1. The method of air conditioning an enclosure which consists in routing in a first path air withdrawn from said enclosure and air intaken from the outdoor atmosphere in desired proportions, circulating in a second path air withdrawn from said enclosure and air intaken from the outdoor atmosphere in desired proportions, controlling the proportions of return air and outdoor air supplied to one of said paths in accordance with one psychrometric characteristic of the outdoor atmosphere, controlling the proportions of outdoor and return air supplied to said other path in accordance with changes in another psychrometric characteristic of the outdoor atmosphere, dehydrating air supplied to one of said paths, abstracting heat from air supplied to said other path by circulating a cooling medium in heat exchange relation with said air, supplying to said enclosure air from both of said paths, and controlling the proportions of air drawn from the different paths for supply to said enclosure.

2. The method of air conditioning an enclosure which consists in withdrawing air from the enclosure, circulating a portion of said withdrawn air through a first path, circulating another portion of said withdrawn air through a second path, supplying outdoor air to said first path to augment said withdrawn air, supplying outdoor air to said second path to augment said withdrawn air, controlling the proportions of withdrawn air and outdoor air circulated in said first path in accordance with changes in the wet bulb temperature of the outdoor atmosphere, controlling the proportions of the withdrawn air and outdoor air circulated in said second path in accordance with variations in the dry bulb temperature of the outdoor atmosphere, subjecting air circulated in said first path to the action of a dehydrating agent, subjecting air circulated in said second path to the action of a cooling medium, supplying to said enclosure air from both of said paths and controlling the proportions of air drawn from the different paths for supply to said enclosure.

3. The method of air conditioning an enclosure which consists in withdrawing air from the enclosure, circulating a portion of said withdrawn air through a first path, circulating another portion of said withdrawn air through a second path, supplying outdoor air to said first path to augment said withdrawn air, supplying outdoor air to said second path to augment said withdrawn air, controlling the proportions of withdrawn air and outdoor air circulated in said first path in accordance with changes in the wet bulb temperature of the outdoor atmosphere, controlling the proportions of the withdrawn air and outdoor air circulated in said second path in accordance with variations in the dry bulb temperature of the outdoor atmosphere, subjecting air circulated in said first path to the action of a dehydrating agent, subjecting air circulated in said second path to the action of a cooling medium, supplying to said enclosure air from both of said paths, and controlling the proportions of air drawn from the different paths for supply to said enclosure in accordance with changes in the wet bulb temperature of said enclosure.

4. The method of air conditioning an enclosure which consists in withdrawing air from the enclosure, circulating a portion of said withdrawn air through a first path, circulating another portion of said withdrawn air through a second path, supplying outdoor air to said first path to augment said withdrawn air, supplying outdoor air to said second path to augment said withdrawn air, controlling the proportions of withdrawn air and outdoor air circulated in said first path in accordance with changes in the wet bulb temperature of the outdoor atmosphere, controlling the proportions of the withdrawn air and outdoor air circulated in said second path in accordance with variations in the dry bulb temperature of the outdoor atmosphere, subjecting air circulated in said first path to the action of a dehydrating agent, subjecting air circulated in said second path to the action of a cooling medium, supplying to said enclosure air from both of said paths and controlling the proportions of air drawn from the different paths for supply to said enclosure in accordance with changes in the wet bulb temperature of said enclosure and controlling the cooling of air circulated in said second path in accordance with changes in the dry bulb temperature of the atmosphere in said enclosure.

5. The method of air conditioning an enclosure which consists in routing in a first path air withdrawn from said enclosure and air intaken from the outdoor atmosphere in desired proportions, circulating in a second path air withdrawn from said enclosure and air intaken from the outdoor atmosphere in desired proportions, controlling the proportions of return air and outdoor air supplied to one of said paths in accordance with one psychrometric characteristic of the outdoor atmosphere, controlling the proportions of outdoor and return air supplied to said other path in accordance with changes in another psychrometric characteristic of the outdoor atmosphere, dehydrating air supplied to one of said paths, abstracting heat from air supplied to said other path by circulating a cooling medium in heat exchange relation with said air, and supplying to said enclosure air from both of said paths.

6. The method of air conditioning an enclosure which consists in withdrawing air from the enclosure, circulating a portion of said withdrawn air through a first path, circulating another portion of said withdrawn air through a second path, supplying outdoor air to said first path to augment said withdrawn air, supplying outdoor air to said second path to augment said withdrawn air, controlling the proportions of withdrawn air and outdoor air circulated in said first path in accordance with changes in the wet bulb temperature of the outdoor atmosphere, controlling the proportions of the withdrawn air and outdoor air circulated in said second path in accordance with variations in the dry bulb temperature of the outdoor atmosphere, subjecting air circulated in said first path to the action of a dehydrating agent, subjecting air circulated in said second path to the action of a cooling medium, and supplying to said enclosure air from both of said paths.

7. The method of air conditioning an enclosure which consists in routing in a first path air withdrawn from said enclosure and air intaken from the outdoor atmosphere in desired proportions, circulating in a second path air withdrawn from said enclosure and air intaken from the outdoor atmosphere in desired proportions, controlling the proportions of return air and outdoor air supplied to one of said paths in accordance with one psychrometric characteristic of the outdoor atmosphere, controlling the proportions of outdoor and return air supplied to said other path in accordance with changes in another psychrometric characteristic of the outdoor atmosphere, removing moisture from air supplied to one of said paths, abstracting heat from air supplied to said other path by circulating a cooling medium in heat exchange relation with said air, and supplying to said enclosure air from both of said paths.

CARLYLE M. ASHLEY.